(12) United States Patent
Wachira et al.

(10) Patent No.: US 11,270,189 B2
(45) Date of Patent: Mar. 8, 2022

(54) COGNITIVE DECISION PLATFORM FOR HONEY VALUE CHAIN

(71) Applicant: International Business Machines Corporation, Armonk, NY (US)

(72) Inventors: Charles Muchiri Wachira, Karatina (KE); Nelson Kibichii Bore, Lessos (KE); Komminist Weldemariam, Ottawa (CA); Lucile Ter-Minassian, London (GB)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 16/665,633

(22) Filed: Oct. 28, 2019

(65) Prior Publication Data

US 2021/0125035 A1    Apr. 29, 2021

(51) Int. Cl.
*G06N 3/04* (2006.01)
*G06K 9/00* (2022.01)
(Continued)

(52) U.S. Cl.
CPC .......... *G06N 3/0454* (2013.01); *A01K 57/00* (2013.01); *G06K 9/0063* (2013.01); *G06N 3/08* (2013.01); *B64C 39/024* (2013.01)

(58) Field of Classification Search
CPC ........ G06N 3/0454; G06N 3/08; A01K 57/00; G06K 9/0063; B64C 39/024
See application file for complete search history.

(56) References Cited

U.S. PATENT DOCUMENTS 9,898,688 B2    2/2018 Bleiweiss
10,402,919 B2*   9/2019 Farah ............... G06Q 50/02
(Continued)

FOREIGN PATENT DOCUMENTS

CA    2991427 C    1/2017
CN    102823628 A   12/2012
(Continued)

OTHER PUBLICATIONS

Nooney, K., Deep dive into multi-label classification..! (With detailed Case Study), https://towardsdatascience.com/journey-to-the-center-of-multi-label-classification-384c40229bff, Jun. 7, 2018, Accessed on Oct. 28, 2019, 25 pages.
(Continued)

*Primary Examiner* — Fayyaz Alam
(74) *Attorney, Agent, or Firm* — Scully, Scott, Murphy & Presser, P.C.; Shimon Benjamin

(57) ABSTRACT

In an aspect, a decision platform that optimizes honey value chain can be provided. The decision platform may receive images of a geographic region including catchment areas, run a first machine learning model with the images as input to identify resources in the catchment areas, run a second machine learning model with the identified resources to predict pollen and nectar concentration in the catchment areas, run a third machine learning model with at least the predicted pollen and nectar concentration to predict honey yield in each of the catchment areas, and determine placement of a swarm to at least one of the catchment areas. The decision platform may also control an unmanned aerial vehicle to guide the swarm to at least one of the catchment areas.

20 Claims, 12 Drawing Sheets

(51) Int. Cl.
  *A01K 57/00* (2006.01)
  *G06N 3/08* (2006.01)
  *B64C 39/02* (2006.01)

(56) References Cited

U.S. PATENT DOCUMENTS

| | | | |
|---|---|---|---|
| 2004/0077290 | A1 | 4/2004 | Bromenshenk et al. |
| 2014/0220150 | A1 | 8/2014 | Stamets |
| 2017/0071169 | A1 | 3/2017 | Benedetti et al. |
| 2018/0092336 | A1 | 4/2018 | Erickson et al. |
| 2018/0108123 | A1 | 4/2018 | Baurer et al. |
| 2018/0271027 | A1* | 9/2018 | Funabashi .............. G06Q 50/02 |
| 2018/0288977 | A1 | 10/2018 | Hummer et al. |

FOREIGN PATENT DOCUMENTS

| | | |
|---|---|---|
| CN | 105028179 A | 11/2015 |
| CN | 107018382 A | 8/2017 |
| CN | 108594678 A | 9/2018 |
| WO | 2016120649 A2 | 8/2016 |

OTHER PUBLICATIONS

Pathak, M., "Using XGBoost in Python", https://www.datacamp.com/community/tutorials/xgboost-in-python, Jul. 10, 2018, Accessed on Oct. 28, 2019, 22 pages.

Tiwari, A., "A Deep Learning Approach to Recognizing Bees in Video Analysis of Bee Traffic", Utah State University, Aug. 2018, 48 pages.

CSIRO, "THe GIHH—The Global Initiative for Honey bee Health (GIHH)", https://research.csiro.au/gihh/about/, Accessed on Aug. 14, 2019, 2 pages.

Sharma, A., "Monitoring Beehives Through ML And Deep Learning Will Have Positive Ecological Ramifications", https://www.analyticsindiamag.com/monitoring-beehives-through-ml-and-deep-learning-will-have-positive-ecological-ramifications/, Sep. 11, 2018, 7 pages.

Von Frisch, K., "Decoding the Language of the Bee", Nobel Lecture, https://www.nobelprize.org/prizes/medicine/1973/frisch/lecture/, Accessed on Sep. 26, 2019, 7 pages.

Wikipedia, "File: Bee dance.svg", https://en.wikipedia.org/wiki/File:Bee_dance.svg, Accessed on Sep. 26, 2019, 5 pages.

Edwards-Murphy, F., et al., "b+WSN: Smart beehive with preliminary decision tree analysis for agriculture and honey bee health monitoring", Computers and Electronics in Agriculture, Jun. 2016, vol. 124, Abstract only, 3 pages.

Meikle, W.G., "Internal hive temperature as a means of monitoring honey bee colony health in a migratory beekeeping operation before and during winter", Apidologie (2017), Received Nov. 4, 2016, Revised Mar. 27, 2017, Accepted Apr. 20, 2017, pp. 666-680, vol. 48.

Lopez-Tagle, E., et al., "Design of an Automated Hive for Bee Proliferation and Crop Betterment", 2017 14th International Conference on Electiical Engineering, Computing Science and Automatic Control (CCE), Sep. 20-22, 2017, 5 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

COGNITIVE DECISION PLATFORM FOR HONEY VALUE CHAIN

BACKGROUND

The present application relates generally to computers and computer applications, and more particularly to machine learning, for example, deep learning techniques that enhance honey value chain.

Honey value chain includes processing and production of honey, for example, from inception to finished product. Pollination is vital to life on Earth. Insect-pollinated crops provide human nutrition worldwide. Pollinators play an essential role in helping to feed a rising world population in a sustainable way, as 75% of the world's crops for human consumption depend on pollinators.

Bees maintain biodiversity and a vibrant ecosystem. Bee pollination or insect pollination of wild plants can be considered a life-support mechanism underpinning biodiversity and ecosystem services. In a number of regions, however, pollination services are showing declining trends because of an alarming extinction of bees. Extinction rates of bees are 100 to 1000 times higher than before as the bees encounter growing pressure from the effects of intensified land use, climate change, other species, and the spread of pests and pathogens.

BRIEF SUMMARY

A system, in one aspect, includes a hardware processor and a memory device coupled with the hardware processor. The hardware processor can be configured to receive images of a geographic region including catchment areas. The catchment areas may include one or more potential catchment areas, which may be estimated or identified by the system. The catchment areas may also include one or more existing catchment areas. The hardware processor can also be configured to run a first machine learning model with images as input to identify resources in the catchment areas. The hardware processor can also be configured to run a second machine learning model with the identified resources to predict pollen and nectar concentration in the catchment areas. The hardware processor can also be configured to run a third machine learning model with at least the predicted pollen and nectar concentration to predict estimated honey yield in each of the catchment areas. The hardware processor can also be configured to determine placement of a swarm to at least one of the catchment areas. The hardware processor can also be configured to control an unmanned aerial vehicle to guide the swarm to at least one of the catchment areas.

A computer-implemented method, in one aspect, includes receiving images of a geographic region including catchment areas. The method also includes running a first machine learning model with the images as input to identify resources in the catchment areas. The method further includes running a second machine learning model with the identified resources to predict pollen and nectar concentration in the catchment areas. The method also includes running a third machine learning model with at least the predicted pollen and nectar concentration to predict honey yield in each of the catchment areas. The method further includes determining placement of a swarm to at least one of the catchment areas.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
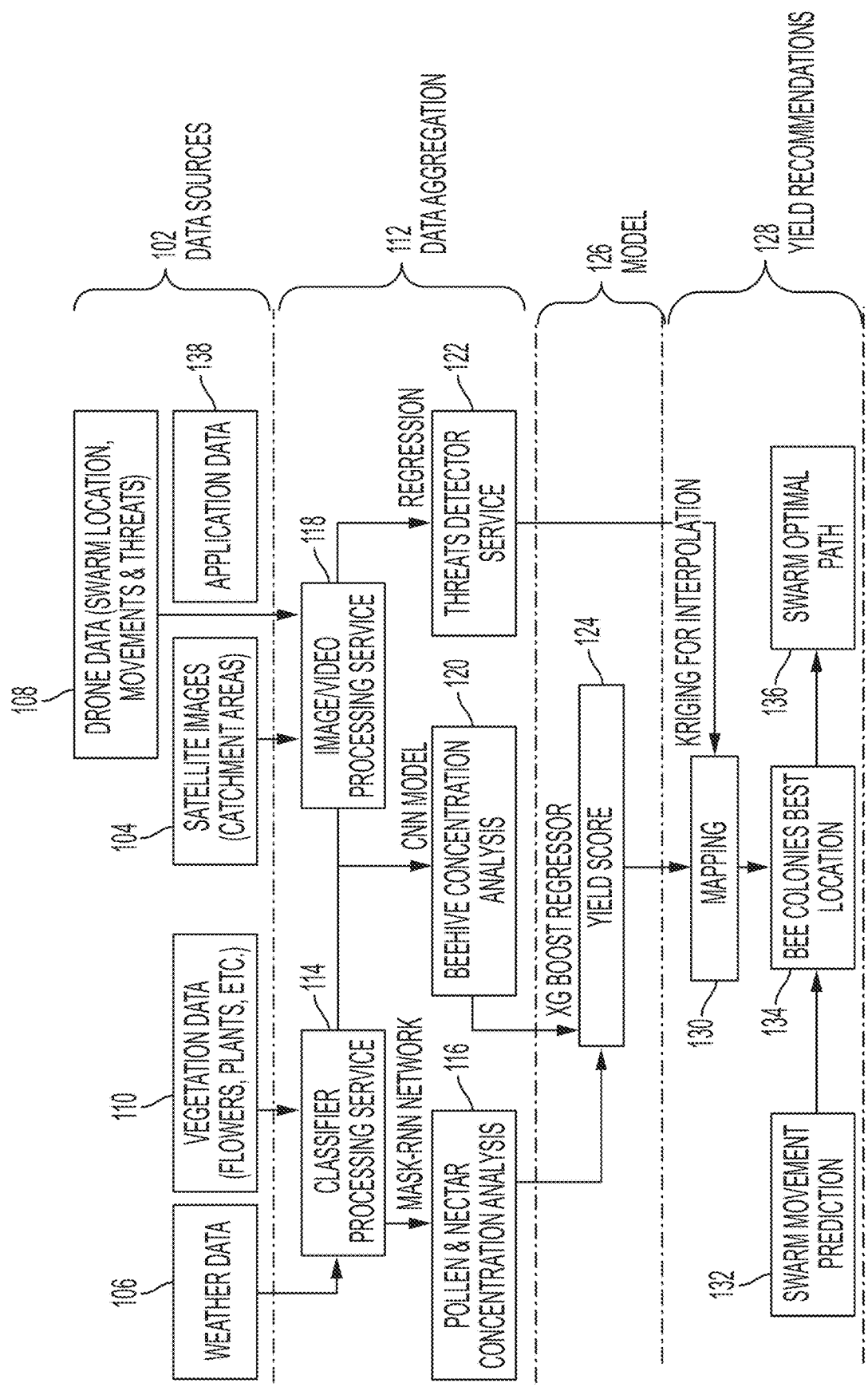
FIG. 1 is a diagram illustrating system architecture in an embodiment.

Systems, methods and techniques can be provided, which may improve honey value chain. In an aspect, systems, methods and techniques may protect bees or pollinators (pollinating agents) and improve their spatial distribution as to boost crop yields and protect the Earth's ecosystem. In some embodiment, a method and system may identify resources such flowers, vegetation, forest for improved honey value chain. A method can be a computer-implemented method executing on one or more hardware processors. A system can include one or more hardware processors and/or computer components. For example, a system may be coupled to or connected to a first set of bee farming multimodal data sources and may obtain (or receive) from the first set of bee farming multimodal data sources, a first set of bee farming data associated with a geographic area. The system may identify flowering plants and/or vegetation based on the first set of bee farming data, estimate the concentration of pollen and nectar in catchment areas in the geographic area, and estimate predicted honey yield in each of the catchment areas. The system may also recommend placement of beehives (also referred to as swarms) in one or more catchment areas while improving honey yield. The system may further intelligently predict and map possible threats and pollination potentials, and monitor the movements of bee colonies using deep learning techniques.

Existing technologies may mimic the pollination process itself, but those technologies do not tackle the extinction of bees or pollinators. Existing monitoring techniques also do not cover a large-scale monitoring of the density and the migration of bee colonies. Embodiments of the systems, methods and techniques described herein may provide the ability to identify, characterize, and predict availability (e.g., trajectory and duration) and concentration of pollen resources (e.g., flowers, vegetation, forest) in an apiary site, model and map threats and pollination potential for bees in a given area, and model a decision-making process that determines one or more locations where the bee colony can be transported to keep the colony safe and to facilitate yield and pollination. Embodiments of the systems, methods and techniques described herein may also counter the initial migration plans of the colony by incentivizing bees into following a given path toward the calculated optimal localization.

In embodiments, the systems, methods and techniques described herein may obtain and use planetary-scale data to model large scale and hyper-local factors that directly affect the food ecosystem. In embodiments, the system and/or method may implement artificial intelligence (AI) techniques and utilize technology such as internet of things (IoT), remote sensing and/or blockchain. For instance, accurate insights of an environment can be gained from satellite imagery and IoT sensors.

In embodiments, the systems, methods and techniques can use the planetary scale data and associated technologies to improve the honey value chain. In embodiments, for example, a system may implement one or more deep learning techniques for optimizing pollinator density and thus crop pollination and incorporate a drone-based system to incentivize swarm into following a designated path. Swarming is the process by which a new honey bee colony is formed when the queen bee leaves the colony with a large group of worker bees. Swarming can be considered a spring phenomenon, usually within a two- or three-week period depending on the locale. The drone-based system may allocate newly formed swarms to an optimal location.

In embodiments, the systems, methods and techniques may identify, predict, and characterize availability and concentration of resources (e.g., flowers, vegetation, forest) and threats (pollution, ecosystem destruction, climate threats) in an apiary site and recommend placement for swarms to improve yield. The system may initiate with constructing a knowledge corpus of data sets, which the system may pre-process, explore, and feed to one or more custom tailed machine learning algorithms. Such one or more machine learning algorithms can run on an edge and cloud interface.

FIG. 1 is a diagram illustrating system architecture in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

The system may receive or obtain a plurality of data sources 102. The system may be enabled to access satellite data 104, for example, access data from various remote sensing sources such as Modis, Landsat 8, Sentinel 2A, and/or another satellite system. A storage system may continuously process and store the data on a storage device or system and provide access to a large number of organized, query-able or searchable geospatial-temporal data, which may also include data such as map data, weather data, drone (e.g., unmanned aerial vehicle (UAV)) acquired data, IoT data. High resolution data can be acquired by a drone (e.g., UAV) equipped with camera or image taking capability. For instance, the unmanned aerial vehicle can be configured to collect high definition images.

The system may also obtain or receive weather data 106, for example, from sources such as a weather company or the like, a database that estimates and stores weather data. Sources for weather data may process or predict weather data, for examples based on AI, Internet of Things (IoT) and analytics technologies.

The system may also obtain or receive application data 138, which may include image and/or video data on one or more beehives and their conditions. Application data may also include barcode, radio-frequency identification (RFID) and/or global positioning system (GPS) data, which can contain data associated with the location and movement of bees, and help to establish and track "source of" honey for each beehive. By way of example, data associated with swarm location, movements and threats can be acquired by a drone (or UAV). For instance, drone data 108 can include this type of data. With each location and movement data of beehives collected, using a time series algorithm for example, the system can establish (with the geo-spatial data) where honey came from. The system thus can allow consumers to trace and view the sources of honey and hence quality of honey, for example, whenever needed.

The system may also obtain or receive data associated with potential environmental activities that can pose a threat to honey value chain. Such data may include data on construction work, road work, type of pesticides, quantity and location of the pesticides, dates at which pesticides are sprayed, plantation of a forest, new farm implanted nearby, any ecosystem destruction, or reconstitution. Sources such as national agricultural databases may store at least some of such types of data. Such data may also be acquired by a drone (or UAV). For instance, drone data 108 can include such types of data.

The system may also use other data, including but not limited to, existing data from local sources (e.g., locations and/or profiles of farmers and/or beekeepers, apiary farms, and associated documents, pictures and other materials, the number of colonies at hand, etc.), honey historical yields and/or supply (e.g., in given catchment areas or similar catchment areas), historical demand data, bee ontologies, disease datasets, for example, if available. Such data may include vegetation data 110, for example, data about plants and flowers in a catchment area.

The system may intelligently optimize the spatial distribution of bee hives in a given area <A> to prevent them from threats (e.g., pests, pesticides, ecosystem destruction or reconstitution) and optimize the pollination. For instance, the system may map the area A according to threats and pollination potential by implementing one or more deep learning-based predictive methods and deploying drones and cameras inside the hives for data collection. The system may incentivize pollinators (e.g., bees) to migrate to a point determined to be optimal using a deep learning model, for example, by implementing one or more drones to attract the pollinators to areas with a high pollination potential and to repel the pollinators from threatening areas.

Data aggregation process 112 can include multiple machine learning processing. For example, a machine learning classifier 114 may output flowering information based on vegetation data 110, weather data 106, and satellite data 104. The classifier 114 can be an artificial neural network trained to identify plants and/or flowers and associated flowering periods and other data.

A Mask-RNN, a recurrent neural network, can be implemented for pollen and nectar concentration analysis at 116. Such a Mask-RNN can identify pollen and nectar concentration in catchment areas based on flowering periods and plant data. Images of catchment areas 104 and data associated with swarm location, movements and possible threats (e.g., captured via a drone or like system) 108 can be input for image and/or video processing at 118. For instance, a Convolutional Neural Network (CNN) can be implemented to perform beehive concentration analysis at 120. Such a CNN can identify based on images of the area, objects representing bee or beehive concentration. A regression model can be implemented to perform threat detection in the catchment areas at 122.

A model 126, for example, an Extreme Gradient (XG) Boost regressor can be implemented, which can output a yield score 124. Pollen and nectar concentration determined at 116 and beehive concentration determined at 120 can be input to a XG Boost regressor, which produces the yield score 124. The yield score 124 represents an estimated yield or production of the amount of honey over a defined time frame.

Yield recommendation 128 can include generating a mapping 130 of threats based on threat detection performed at 122. Based on the mapping 130 and swarm movement prediction 132, an optimal bee colonies location can be determined at 134. Optimal path for the swarm can be determined at 136 and the swarm guided to the optimal path, for instance, by a set of drones.

Figure 2:
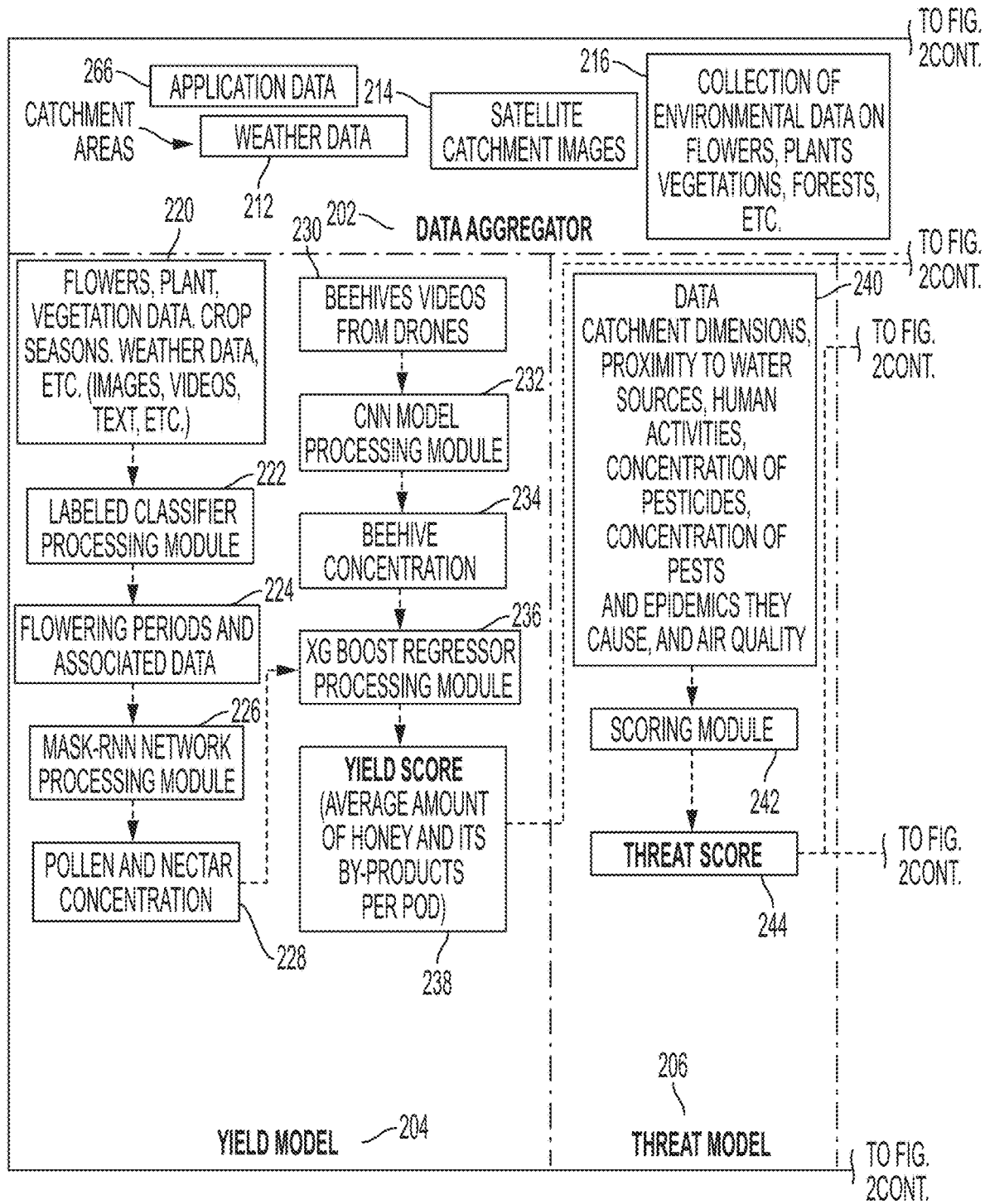
FIG. 2 illustrates an overview of system components in an embodiment.
Figure 2:
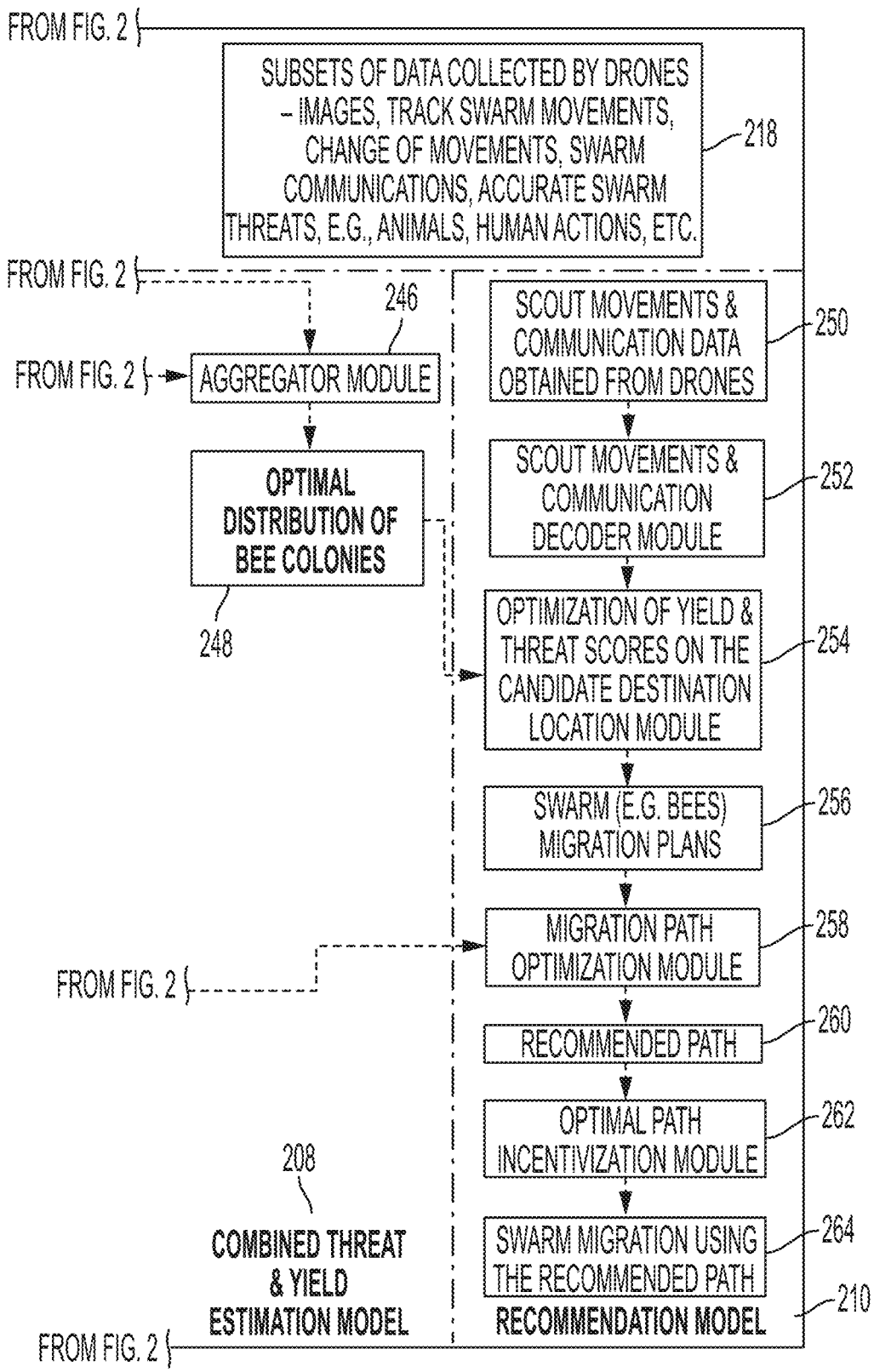

FIG. 2 illustrates an overview of system components implementing a decision platform for honey value chain in an embodiment. The components can include, but not limited to, a data aggregator 202, a yield model 204, a threat model 206, a combined threat and yield estimation model 208 and a recommendation model 210. The components include machine learning models. The components may be implemented on or by one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. The decision platform may function to perform the following: identifying, characterizing, and/or predicting flowers, vegetation, and/or forest concentration; mapping the optimal spatial distributions of bee colonies in a given catchment area based on external threats for the bees' safety and potential yield improvement of nearby crops; predicting where swarms will go next using drones and cameras inside the hive; countering bees' initial migration plans using wavelength and scent; incentivizing bees into following a given path or trajectory toward an optimal localization of the hive using drones and scent (sense of smell) to protect the bees from threats in catchment areas and to optimize honey yield.

A data aggregator 202 may gather or obtain data from a plurality of sources. The data is associated with a geographic area, for example, one or more catchment areas. The data may include weather data 212, application data 266, satellite catchment images 214, collection of environmental data 216 for example, on flowers, plants, vegetations, forests, and data 218 which can be collected by drones or other automated machines or vehicles such as images, swarm movement tracks, change of movements, swarm communications, swarm threats posed by other animals and industrial or like activities.

A function of the yield model 204 may identify, characterize, and/or predict flowers, vegetation, and/or forest concentration for bees so that recommendation in apiary site selection, establishment and monitoring can be efficiently optimized. By way of example, the yield model 204 may identify various flowering plants, crops, and/or vegetations (e.g., including milkweed, dandelions, clover, goldenrod and a variety of fruit trees, etc.) concentration areas <A> using remote sensing and/or drone data sources 220. The concentration areas <A> can be geo-tagged and/or geofenced areas or locations. For instance, at 222, the yield model 204 may receive as input a number of labeled images pertaining to different variety of plants, crops, vegetations and feed the labeled images to a multi-labeled classifier, which can run on a processor, for example, an assist processor on a set of drones deployed in a particular concentration area <A>. The labels include human annotated plant/crop/vegetation types, variety type for plants/crop/vegetation, growth trajectory of the plant/crop/vegetation, etc. to aid the corresponding machine learning models. The labeling may be done by human and/or training AI system. The training set for the multi-labeled classifier can include the number of labeled images pertaining to different variety of plants, crops, vegetations. Each image instance can be associated with a set of labels. The multi-labeled classifier can estimate or predict the label sets of unseen instances (unlabeled instances) through analyzing the training set instances with previously known label sets.

For each area A in <A>, the yield model 204 may identify a variety of flower classes, e.g., using a multi-label classification algorithm and/or knowledge graph or model built from a plurality plant data sources.

The set of drones deployed in the concentration area <A> can be controlled to initiate the data congregation using imprint scanning. A technique such as a Visual Simultaneous Localization and Mapping (VSLAM) mechanism can determine the coordinate position where the concentration of a specific crop and/or vegetation identified using the assist processor, is greater than a predefined threshold amount and the places within the area <A> where the distribution is centralized. Those images while being processed can be geo-tagged with date and time in order to make the yield model 204 more geospatially aware and can be added to the JavaScript Object Notation (JSON) script to be ingested by the machine learning (ML) container, for example, the multi-labeled classifier. For instance, executing the JSON script initiates the multi-labeled classifier with the images as input to the multi-labeled classifier.

The above data congregation and image processing can iterate over multiple epochs (multiple training cycles, each cycle through a full training dataset) to establish the flowering period for each identified class of crop and/or vegetation over a sustained period of time at intervals (e.g., sporadic intervals) with geotagged images of the crops, for example, shown at 224. The time parameter can be associated with or linked to the crop metadata in a given area <A>.

Shown at 228, the yield model 204 may also estimate concentration level C of pollen and nectar for each identified class of crop and/or vegetation in each area <A> using Mask-RNN network 226. As part of concentration identification of pollen and nectar in a given area, the yield model 204 can estimate the number of bees to be fed (can be extracted from the beehives capacity) using historical data, expert knowledge, etc. based on using the probability distribution function of concentration of pollen in correlation with beehives in a given area.

Using the probability density function (PDF) likelihood, the yield model 204 determines the trajectory of the flowering duration based on the estimate concentration level <C, A> by associating the timing metrics identified above, which is used to determine a yield estimation output.

In an embodiment, a system described herein deploys one or more drones to catchment areas for monitoring one or more bee colonies. The catchment areas need not necessarily cover all regions, but can cover at least some region (e.g., at least a 5 kilometer square) around each hive, considering for instance that bee swarms do not migrate more than one kilometer away from their initial hive. The demarcation of areas and number of drones assigned to the area can be based on: the density of bees and bee hives located in the area wherein the density may be initially configured or determined based on real-time monitoring and analysis of density; the detection or prediction of an epidemics rate in an area <A>; and/or the detection or prediction of a high pollen concentration in an <A>. The demarcation of areas can be contextually geo-fenced and the drones can be controlled according to geo-fence rules.

In an embodiment, initially, one or more drones can be manually deployed to catchment areas, where the number of drones to each catchment area can be based on the beekeepers. One or more drones may collaboratively monitor bee swarms or hives from different angles and/or directions.

Figure 3:
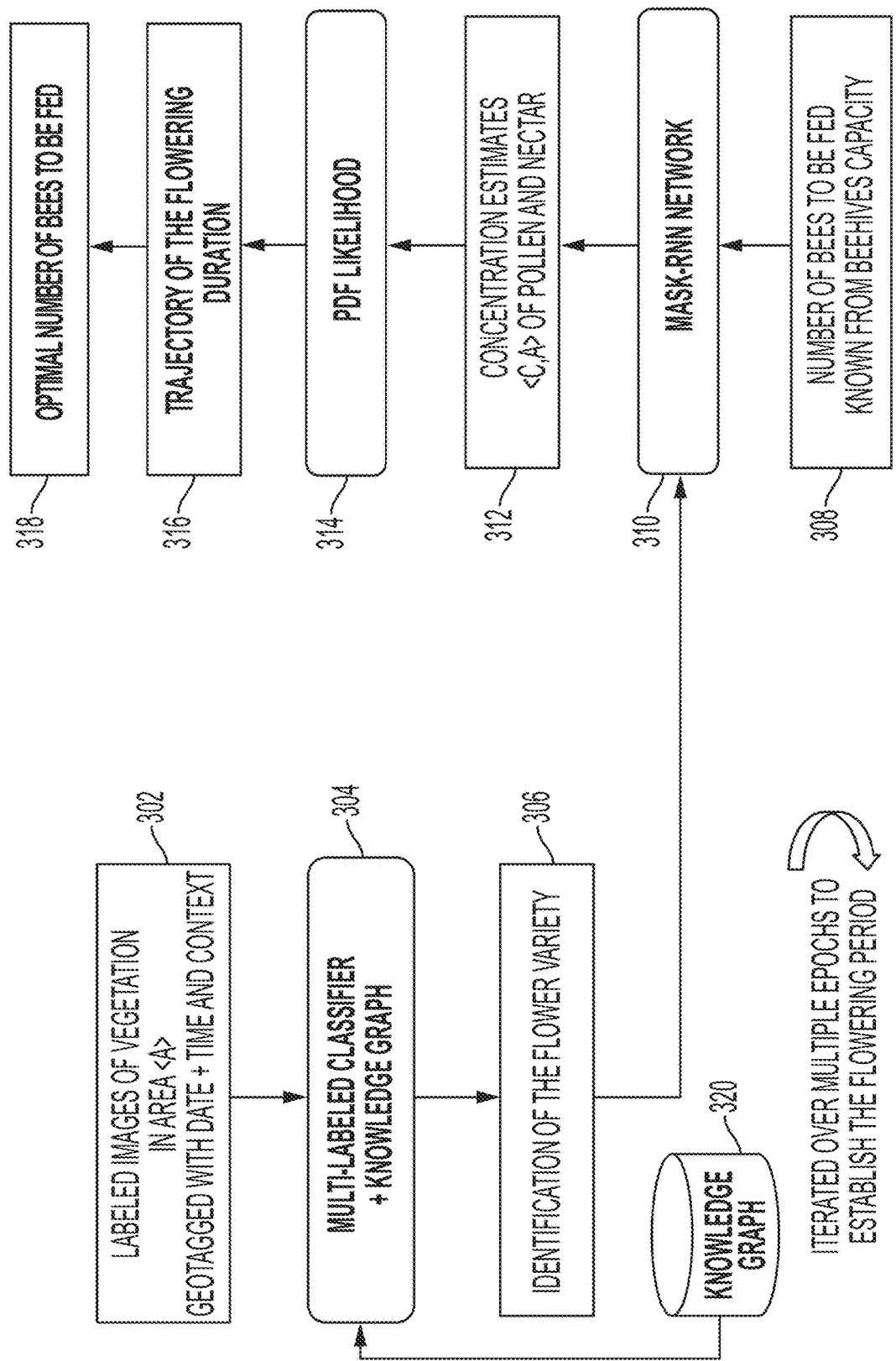
FIG. 3 is a diagram illustrating identification and prediction of flower or vegetation concentration in an embodiment.

FIG. 3 is a diagram illustrating identification and prediction of flower or vegetation concentration in an embodiment. Labeled images of vegetation in an area (referred to as area <A>) 302 can be received. For example, the images can be labeled with geotags (geographic location), date and time. At 304, the labeled images received at 302 and knowledge graph 320 can be input to a multi-labeled classifier. The multi-labeled classifier classifies the images into a type of plant guided by the knowledge graph 320 (which may encode varieties of plants, types of plants, the plant flowing cycle, etc., extracted from publicly available plant data sources) that enhances its classification results. For example, identification of plant variety 306 can be output (e.g., flower, vegetation). Identification of plant variety 306, initial number of bees to be fed known from beehives capacity 308 and historical data on the existing successful beehives can be input to a Mask-RNN network at 310. The value or range for the initial number of bees is configurable. In an embodiment, the Mask-RNN network 310 can output an estimated concentration <C,A> of pollen and nectar at 312. At 314, probability density function (PDF) likelihood method can determine a trajectory of the flowering duration 316 in the area. Using the trajectory of the flowering duration 316, initial numbers of bees to be fed 308, and estimated concentration level C of nectar for each identified class of crop and/or vegetation in each area <A> 312, the PDF model can further output optimal number of bees and/or beehives 318. The processing from 302-306 can repeat over periods of time to establish the flowering periods. In an embodiment, output of the classifier 304 is connected to input of the Mast-RNN 310.

Figure 4:
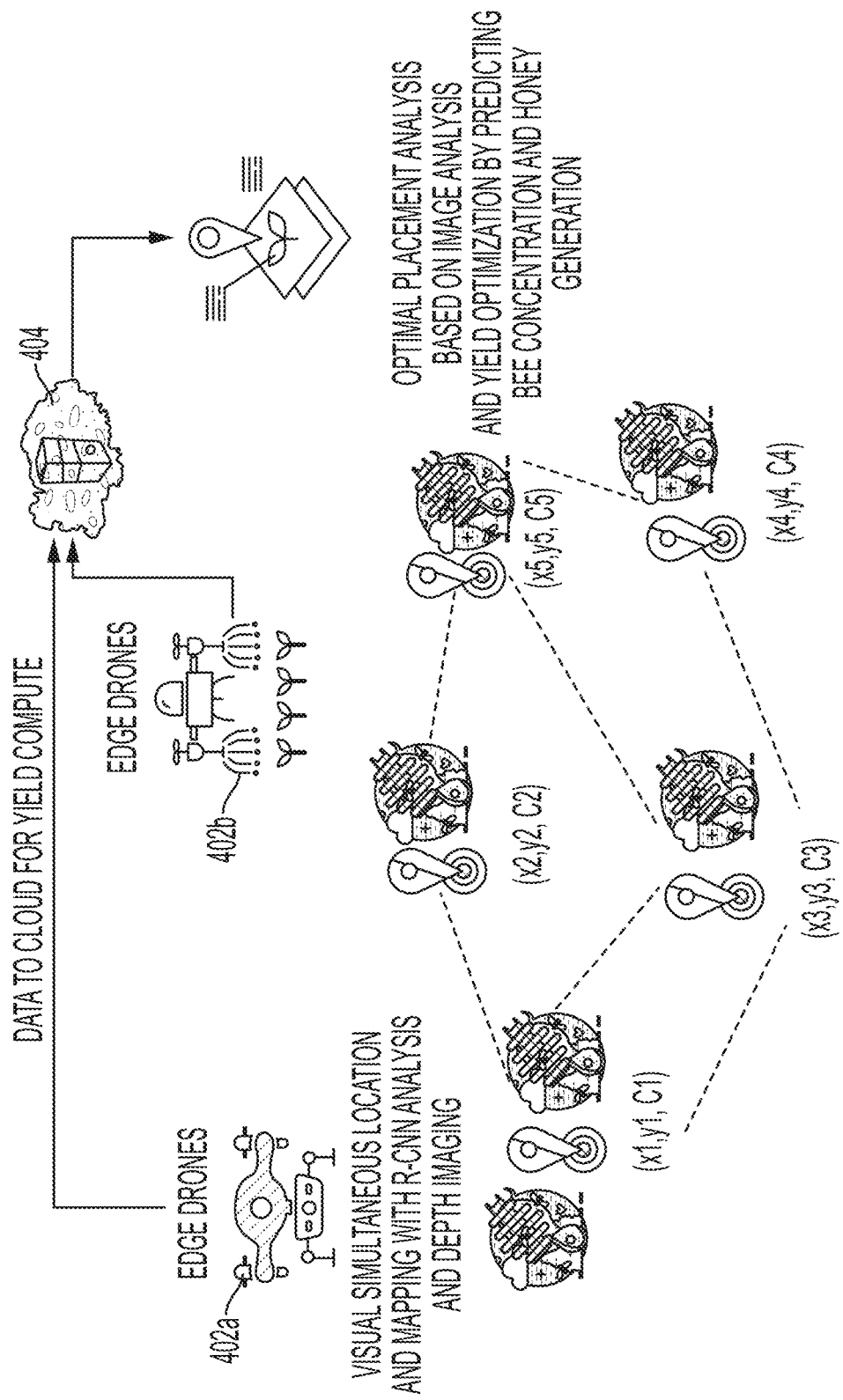
FIG. 4 shows coordinates (x, y) and concentration levels (C levels) of the pollen generated at different locations <A> in an embodiment.

The following describes an example implementation for a yield estimation model, for example, shown at 204 in FIG. 2. FIG. 4 shows coordinates (x, y) and concentration levels (C levels) of the pollen generated at different locations <A> in an embodiment. This is correlated with previous locations where the yield at specific (x, y) places and the overall yield y1 and now the yield post placement is y2 wherein y1<y2. In an embodiment, the decision platform may continually detect the variations in geotagged visual analysis data being captured by a set of drones 402a 402b in a given contextual environment (weather, season metrics) and monitor the delta variations in the concentration level associated with crops in a space and bees hovering in the geo-spatial area <A> at time T. In an embodiment, using an associative clustering model in a given region A, the system may identify the bee colonies corresponding to the pollen being generated over a period of time. In an embodiment, yield computation can be performed on a cloud-based system 404 based on data collected by the set of drones 402a, 402b over time.

Another numerical feature which is covered can include counting the number of bees in the given perimeter. For instance, a geofenced region R is created around (x1, y1) with concentration Cl. A radius of R, which can be configured by a user and detected by one or more drones is fed to an R-CNN model. A counter is initiated once the drone monitors a particular cluster of bees within the radius of R. Depending on the density of bees hovering in the space based on contour boxes, masking counted bees once accounted for keeps track of the bees which have been counted.

For instance, referring to FIG. 2, at 230 beehive data such as videos taken by a set of drones can be received. An R-CNN processing can be performer at 232. At 234, beehive concentration can be output by the R-CNN processing at 232.

In an embodiment, the count of bees in a given area can be considered to be in direct correlation with the concentration of yield being generated in that particular area.

Yield in an embodiment can be computed as follows:

$$Y_{yield} = f(w_1 * (P+B) * A + \text{Avg}(C_{<A>})),$$

where f is a linear function of time.

A represents an area, P represents pollen, B represents beehives and C represents an amount of honey.

Concentration of pollens in a given area A is estimated to be P*A, given that P is per area such as per square meter.

Beehives concentration in a given area A is estimated to be B*A, given that B is per area such as per square meter.

Average honey output per pod is represented as Avg C.

At 236, a time series progression of yield data at given time frame f and concentration metrics C inculcated with weather parameters W can be fed to a machine learning algorithm (e.g., extreme gradient boosting or XG Boost regressor) to predict the estimated yield in a given region over a speculative time frame or a time frame of interest, which can be specified or configured. For example, e.g., 80:20 data split can be implemented. At 238, yield score (representing an amount of honey output) can be output or produced.

In an embodiment, since the regressor gradient is trained over a sporadic period of time, the output recommendation module can redistribute the count of beehives to be placed in region A based on the yield model and <C, A> in order to optimize the distribution of yield over time.

In an embodiment, the functions of the decision platform shown in FIG. 2 can include mapping an optimal repartition of bee colonies in a given area based on a combination of a map of (a) external threats for bees and (b) yield prediction for the bees, for instance, combining the output of the yield model and the threats mapping. The decision platform can use data on the potential sites' characteristics to map the threats in different sites for bee colonies. This mapping is combined with a yield model's yield output. The combination results in a mapping of the optimal distribution of bee colonies. By way of example, each catchment area is discretized into a set of 1-meter squares. Each square's features are inputted into a model (e.g., the yield model 204 and the threat model 206). The combined threat and yield estimation model 208 may produce the mapping of the optimal distribution of bee colonies. For instance, the module 246 outputs a map with a risk score and a yield score for each of the squares. For example, the aggregator module 246 may sum both scores 238, 244 with weights. The assignment of final potential score to each square results in the mapping of the optimal distribution of bee colonies 248.

For instance, the threat model 206 may map external threats 244 for bees as follows. The inputs or variables for the threat model and sources of the data 240 may include the localizations of water sources, environmental or industrial activity associated with the area and a mapping of the weather, pesticides concentration, pests spread and air quality. For the input data, a scoring module 242 may compute a score related to each variable. For example, for dimensions and air quality data, variables can be kept in their initial format. For weather data, optimal temperature, humidity and pressure ranges for bees can be used. By way of example, if the three variables are in the optimal range, the weather score can be computed to be 3, if only two are optimal, the weather score can be computed to be 2, and if only one is optimal, the weather score can be computed to be 1, if none are optimal, the weather score can be computed to be 0. Water and activity data can be used systematically locate the most optimal spot for the colony to be the farthest spot away from the water point and/or the activity in the 5 kilometer square (or another regional partition). Pesticides, pests and air quality data can be averaged and assigned to each 1 meter square. Threat score 244 can be output and can be used by other components. For example, the aggregator module 246 can combine the threat score 244 with the yield score 238 to produce an optimal distribution of bee colonies 248. The recommendation model 210 may use the threat score 244 in computing an optimized migration path (e.g., at 258).

The recommendation model 210 may use the distribution mapping at 248 to recommend and/or guide the bee migration. At 250, movements and communications of bees monitored by a set of drones can be obtained. At 252, a module or function may decode the movements and communications data. At 254, a module or function may optimize yield and threat scores on the candidate destination location.

In an embodiment, the aggregator module at 246 may employ a Gaussian process regression method for interpolation, which obtains an optimal distribution of bee (swarm) colonies 248. Gaussian process regression method is a machine learning method. In this method, the interpolated values are modeled by a Gaussian process governed by prior covariances. This is a geostatistical estimator where sampled data is interpreted as the result of a random process. The posterior can be calculated using training data, and the predictive posterior distribution can be computed on points of interest.

The unknown value $z_{potential}$ $(x_0, y_0)$ is interpreted as a random variable located in $(x, y)$ as well as the values of neighboring samples $z_{potential}$ $(x_1, y_0)$, $z_{potential}$ $(x_0, y_1)$, etc. $z_{potential}$ represents the yield at corresponding x, y location coordinate, which is not known yet. The estimator potential $\hat{Z}$ $((x_0, y_0))$, an estimated yield at corresponding x, y location, is also interpreted as a random variable located in $((x_0, y_0))$, a result of the linear combination of variables.

In order to deduce the kriging system for the assumptions of the model, the following error is committed while estimating:

$$\in(x_0) = \hat{Z}(x_0) - Z(x_0) = \Sigma_{i=0}^{N} w_i(x_0) \times Z(x_i) - Z(x_0)$$

In the above equation, $\in$ represents the estimated error, $\hat{Z}$ represents an estimated yield, Z represents an actual yield when known, w represents a weight value, x represents a location coordinate, and N represents the number of locations being considered. N can be the number of all locations available or under consideration.

In an embodiment, training in the Gaussian process regression method may be done by looking at the mapping of each predictor (e.g., pollen, pests, pesticides, etc.) and the mapping of the output (yield of crops and/or bee survival) in a set of different locations to find the optimal coefficients of the regression. For instance, such a mapping can be computed at 246. Output of the Gaussian process regression is an optimal distribution of bee (swarm) colonies 248. In another embodiment, if the odds-ratio between these predictors and the yield of surrounding crops are available they may be used as weights.

At 256, one or more migration plans may be generated based on the optimization of yield and threat scores performed at 254.

In an embodiment, the swarm's spontaneous and natural plans are considered for a change on a need basis, for example, when needed. The decision platform takes into consideration that the bees can benefit from the fact that humans have more information available and can foresee, on the long-term, how good or bad the migration spot chosen by the swarm may be for the bee's health and production.

At 258, a migration path can be optimized, for example, based on threat score. At 260, recommended path can be provided or output.

In an embodiment, the decision platform may measure how good the decision of guiding the bees to migrate to another square B considering that the initially chosen spot is in square A. For every square B, the score $S_A$ (B) may be compared with a preconfigurable or learned threshold $\Delta h_{change}$. The threshold measures how much monitoring may be done and how much the bees should be left to act naturally.

$$S_A(B) = \frac{y_{potential}(B) - y_{potential}(A)}{dist(A, B)} > \Delta h_{change}$$

$y_{potential}(B)$ represents yield of area B;
$y_{potential}(A)$ represents yield of area A;
Dist (A, B) represents the geographic distance between A and B.

If the computed risk score, $S_A$ (B) is above the preconfigurable or learned threshold $\Delta h_{forbidden}$ the square may be considered as "forbidden", meaning the swarm must not go there.

Figure 6:
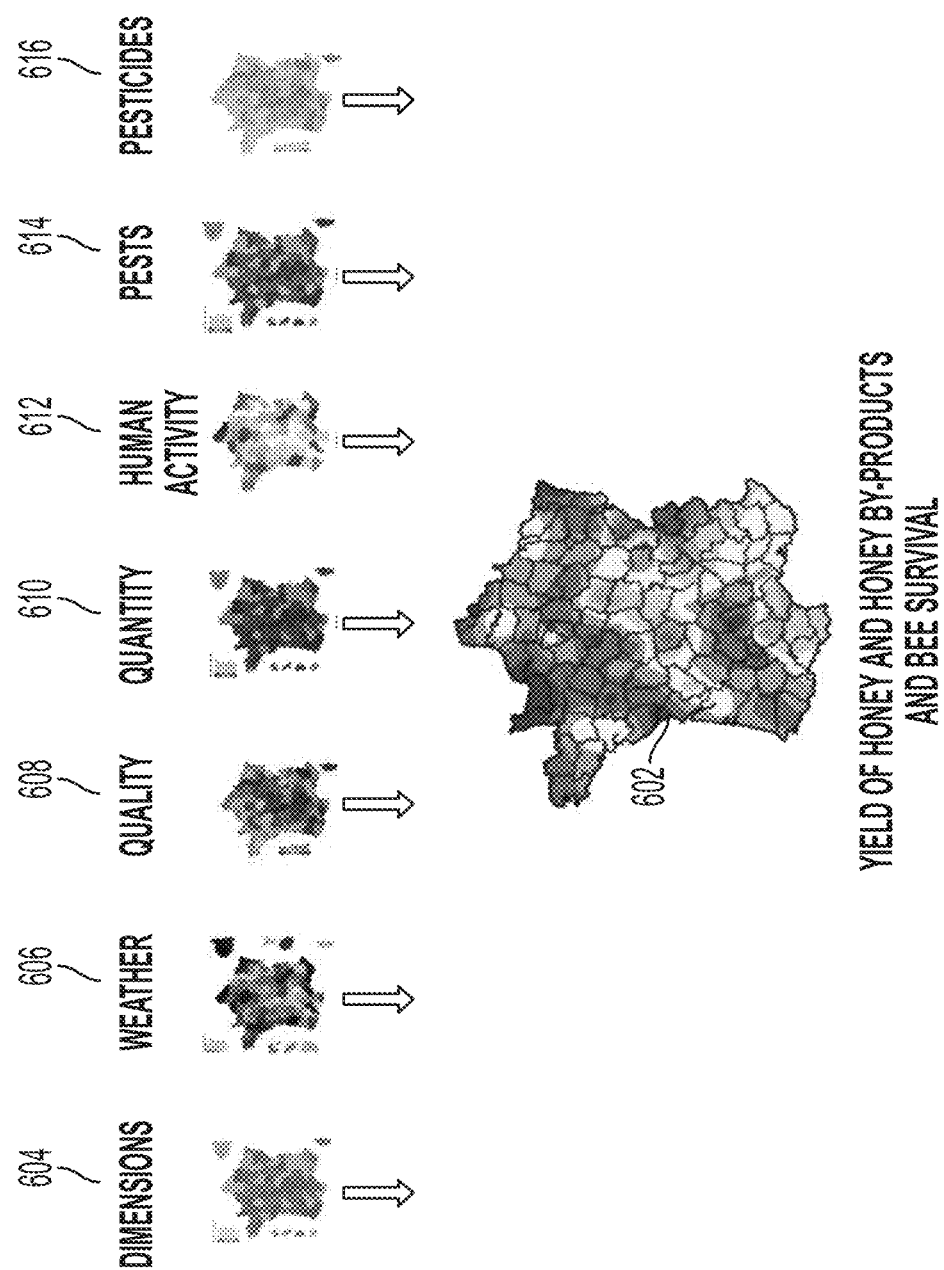
FIG. 6 shows an example map of threats in a pollination area in an embodiment.

In an embodiment, the decision platform can perform protection operations of static beehives from the risk calculated by the decision platform. The decision platform may use a map of the threats relative to pesticides and act to prevent bees from being exposed to the risk thereof. FIG. 6 shows an example map of threats in an embodiment. In an embodiment, a set of drones may help the bees that are part of an implanted colony (e.g., the bees are static in hive or a nest) located next to (or in the area of, or near) a field with a high concentration of pesticides. The decision platform may prevent the bees from pollinating the flowers of this field and getting intoxicated. For a given time after the pesticides have been spread—e.g., according to the half-life and the decay of the chemicals—the set of drone may use repellent to prevent the bees from pollinating the field infested by pesticides. Leveraging known bee repellent, a drone may use smoke, chemical repellent (not harmful to the bees nor the environment), or a signal with a calming wavelength. For instance, one or more drones may emit and spread smoke around the field for 2 days starting when the pesticides have been put in the soil and/or sprayed.

In further embodiment, one or more drones may treat bees that have been in contact with pesticides. The drone-based system may spread medicine (using known safe methods) around colonies that are vulnerable, e.g., colonies located in a threatening area pesticide-wise, determined or predicted by the decision platform.

At 262, the bees can be incentivized to follow an optimal path. In an embodiment, at 264, the decision platform, for example, using a set of drones or like devices may direct or guide swarm migration to follow a recommended path.

In an embodiment, the decision platform may predict where bee swarms will go next, for example, using drones. For example, when a honey bee swarm emerges from a hive the bee does not fly far at first. The bee may gather in a tree or on a branch only a few meters from the hive. In this new location, the bees cluster about the queen and send 20-50 scout bees out to find a suitable new nest location. The scout bees are the most experienced foragers in the cluster. An individual scout returning to the cluster promotes a location she has found. She uses a dance similar to the waggle dance to indicate direction and distance to others in the cluster. The more excited she is about her findings the more excitedly she dances. If she can convince other scouts to check out the location she found, they may take off, check out the proposed site and promote the site further upon their return. Several different sites may be promoted by different scouts at first but once all scouts agree on a final location the whole cluster takes off and flies to it.

A swarm may fly for a kilometer to the scouted-out location, though some species may establish new colonies within as little as 500 meters from the natal nest, such as *Apis dorsata*. This collective decision-making process is remarkably successful in identifying the most suitable new nest site and keeping the swarm intact. A good nest site has to be large enough to accommodate the swarm (about 15 litters in volume), has to be well protected from the elements, receive a certain amount of warmth from the sun, be some height above the ground, have a small entrance and resist the infestation of ants (e.g., trees are often selected).

The decision platform may use one or more drones to observe the movements of scouts to different locations in the catchment area. In parallel, other drones may observe the communication of the scouts returning to the hive. The scouts' waggle dance can be translated into the directions, and the decision platform, based on the translated directions, can determine the swarm's future migration plans.

In an embodiment, the decision platform may counter migration plans that are deemed to be hazardous using wavelength, smoke or smell to repel them. In one embodiment, the decision platform may analyze the migration plans that the swarm has been making. If they are deemed to be unsafe, the decision platform using a drone may prevent the colony from migrating to the designated spot, e.g., using repellent. This may be done, e.g., using chemical compounds to repel the bees. Those liquids or gases may be spread by a drone itself. As another example, a bee dispelling device using a signal generator that emits an acoustic wave signal with 450 Hz-1000 Hz or 4500 Hz-10000 Hz that will make the bees feel dizzy, can be used. The signal generator may be attached to the drone and the drone may activate it when close to the spot designated by the scouting bees if considered hazardous. As still another example, the drone may generate smoke to repel the bees. Smoke makes the bees feel confused at it masks the pheromones they use intensively to communicate for 20 to 30 minutes.

In an embodiment, the decision platform may incentivize bees into following a given path towards the optimal localization of the hive using drones. Based on estimated optimal distribution of bee colonies in a catchment area, the bees can be influenced to migrate to the optimal location by using attractants (synthetic compounds that bees are attracted to). By way of example, this can be done when the scouts that are scouting for a new location to migrate to. A set of drones, e.g., communicating with the decision platform, may be controlled to release the attractants to influence the scout bees toward a recommended path or location. Then, the scout may communicate back to the hive and the whole hive can be caused to migrate via the recommended path and/or to the recommended location. In another example, using a known method, the decision platform may cause trapping of the new queen in an enclosure and control a drone to carry this enclosure to the spot designated as a recommended location or optimal spot (determined by the decision platform). The rest of the swarm (workers, scouting bees) will follow. A drone, for example, in communication with the decision platform, may draw a path toward the optimal spot for the swarm by using attractant to make the swarm follow the given path. In an embodiment, the attraction of bees may be done using chemical compounds and/or bright colours. For example, the chemical attractant may be biodegradable swarm lure, or synthetic bee pheromone. A drone or another device may spread the chemical attractant along the designed path to the designated safe spot. In an embodiment, bright hues or light may be displayed on a screen attached to the drone, e.g., along the way to or at, the designated new location for the colony.

Figure 5:
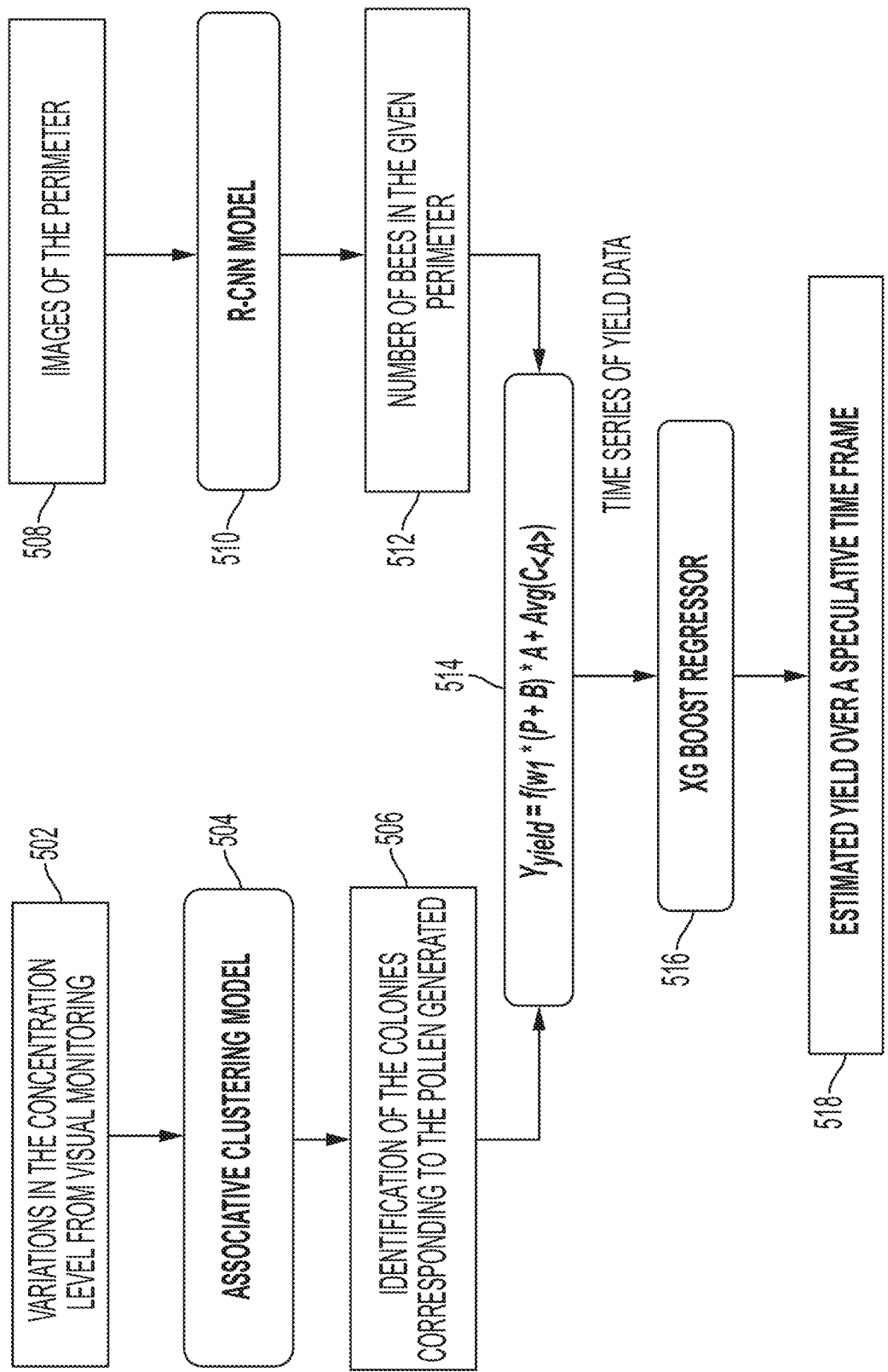
FIG. 5 is a diagram illustrating a process of yield estimation in an embodiment.

FIG. 5 is a diagram illustrating a process of yield estimation in an embodiment, for example, shown at 204 in FIG. 2. Variations in the concentration levels of crops in a space and bees hovering in the geo-spatial area <A> 502, for example, captured by a set of drones, can be input to an associative clustering model 504, which identifies colonies corresponding to generated pollen 506. Images of the area <A> 508, for example, captured by a set of drones, can be input to a Region-Convolutional Neural Network (R-CNN) model 510, which detects or identifies number of bees in the given area <A> 512 based on the input images. At 514, yield data is computed. Time series of the yield data 514 can be input to an XG Boost Regressor 516, which outputs an estimate yield over a speculative time frame 518. Other machine learning models or technique can be used.

FIG. 6 shows an example of a map showing possible threats in an area, for example, pollination area, in an embodiment. Different types of threats can be encoded with different values. The map of the area 602 can be displayed with the different encoded values representing different threats, for example, but not limited to, dimensions/scope of a threat 604, weather 606, air quality 608, quantity 610, human or industrial activity 612, pests 614, and pesticides 616.

In embodiments, methods and systems described herein may predict an optimal distribution of swarms for optimal honey value chain. Such methods and system may include identifying resources such as flowers, vegetation, and/or forest, in catchment areas using a plurality of data sources related to bee farming. The methods and systems may also include estimating a concentration of pollen and nectar, estimating predicted honey yield in each catchment area, and recommending placement of beehives/swarms to one or more catchment areas. The methods and system may identify, characterize, and/or predict flowers, vegetation, and/or forest concentration to optimize pollination. In another embodiment, the methods and systems may include mapping the optimal spatial distributions of bee colonies in a given catchment area based on external threats for the bees' safety and potential yield improvement of nearby honey and its by-products. In further embodiment, the methods and systems may include incentivizing bees into following a given path towards the optimal localization of the hive using drones and smell so to protect them from threats thereof and optimize yield of honey and its by-products.

Figure 7:
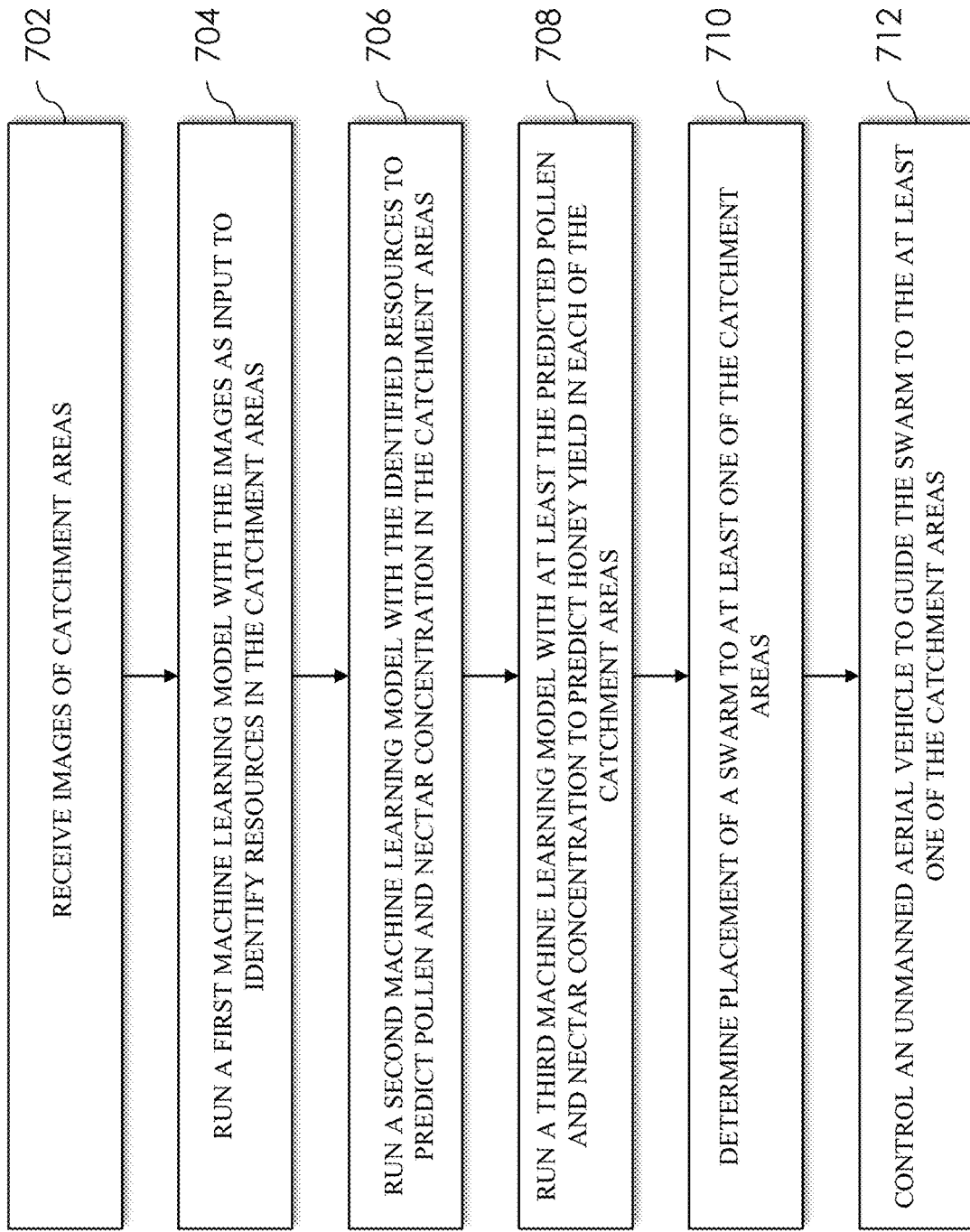
FIG. 7 is a flow diagram illustrating a method for a decision platform, which can enhance honey value chain in one embodiment.

FIG. 7 is a flow diagram illustrating a method for a decision platform, which can enhance honey value chain in one embodiment. The method can be performed by one or more hardware processors associated with the decision platform. The decision platform may predict an optimal distribution of swarms (group of bees) for optimal honey value chain.

At 702, the method may include receiving images of a geographic region, which may include potential catchment areas and/or existing catchment areas. Potential and existing catchment areas are referred to herein generally as catchment areas. One or more unmanned aerial vehicles (UAV), also referred to as a done, can take or capture such images. The decision platform can be in communication with one or more UAVs and control such UAVs.

At 704, the method may include running a first machine learning model with the images as input to identify resources in the region, for example, in the catchment areas. In an embodiment, a trained labeled classifier such as a neural network classifier, a CNN, or another machine learning classifier can identify pollination concentration of a catchment area.

At 706, the method may include running a second machine learning model with the identified resources to predict pollen and nectar concentration in the catchment areas. In an embodiment, a trained mask-RNN can predict a time series of flowering periods and pollen and/or nectar concentration of a catchment area.

At 708, the method may include running a third machine learning model with at least the predicted pollen and nectar concentration to predict honey yield in each of the catchment areas. The third machine learning model can be an XG Boost regressor.

At 710, the method may include recommending placement of a swarm to at least one of the catchment areas.

At 712, the method may also include controlling an unmanned aerial vehicle to guide the swarm to the at least one of the catchment areas.

The method may also include running a fourth machine learning model to estimate a risk score associated with each of the catchment areas. The fourth machine learning model can be a regression model. Estimating a risk score can include determination or estimation of dimensions of the catchment area, proximity to water sources and their depth; analysis of human activities including, but not limited to, analysis of data on construction work, road work, plantation of a forest, deforestation, and new farm implanted nearby (e.g., within a threshold distance); analysis of concentration and effects of pesticides; analysis of concentration of pests and severity of epidemics they cause; and analysis of air quality. In an embodiment, the method may also include estimating a mapping of an optimal distribution of bee colonies based on the yield score and the risk score.

In an embodiment, the method may include predicting where the swarm (e.g., a bee colony) will migrate next. For example, the method may include controlling at least one unmanned aerial vehicle to observe the movements of at least one member of the swarm (e.g., one or more scouts) to different locations in the catchment areas as one or more members scout for new places to migrate, and to observe the communication of one or more members with others, e.g., when they return to the hive.

In an embodiment, the method can also include countering swarm migration plans to areas mapped as high risk using a drone system, e.g., by controlling at least one unmanned aerial vehicle. For instance, an unmanned aerial vehicle or another device can be controlled or caused to apply environmentally friendly synthetic compounds to repel the swarm (e.g., bees) from a location. For example, the method can include applying environmentally friendly synthetic compounds to repel the swarm (e.g., bees) from a location. As another example, an unmanned aerial vehicle or another device can be controlled or caused to apply a smoke chamber to repel the swarm (e.g., bees). For example, the method can including applying a smoke chamber to repel the swarm (e.g., bees). Yet as another example, an unmanned aerial vehicle or another device can be controlled or caused to apply a signal generator that emits an acoustic wave signal, e.g., with 450 hertz (Hz)-1000 Hz or 4500 Hz-10000 Hz, which can make the swarm (e.g., bees) feel dizzy. For example, the method can include applying a signal generator that emits an acoustic wave signal, e.g., with 450 hertz (Hz)-1000 Hz or 4500 Hz-10000 Hz, which can make the swarm (e.g., bees) feel dizzy.

In an embodiment, the method can also include incentivizing the swarm (e.g., bees, scouts) into following a given path toward an optimal localization. For instance, an unmanned aerial vehicle or another device can be controlled to perform attracting and trapping a queen bee (or a leader of the swarm) to a chamber and carrying the queen bee to a desired location. Such an unmanned aerial vehicle or another device can also be controlled to release attractants to migrating swarms or scouts toward an optimal localization.

In an embodiment, a method to predict an optimal distribution of swarms for optimal honey value chain may include identifying key resources (e.g., flowers, vegetation, forest) in catchment areas using a plurality of data sources related to bee farming. The method may also include estimating the concentration of pollen and nectar. The method may also include estimating predicted honey yield in each catchment area. The method may also include recommending placement of beehives or swarms to one or more catchment areas. The method may further include estimating risk score of a catchment area.

Figure 8:
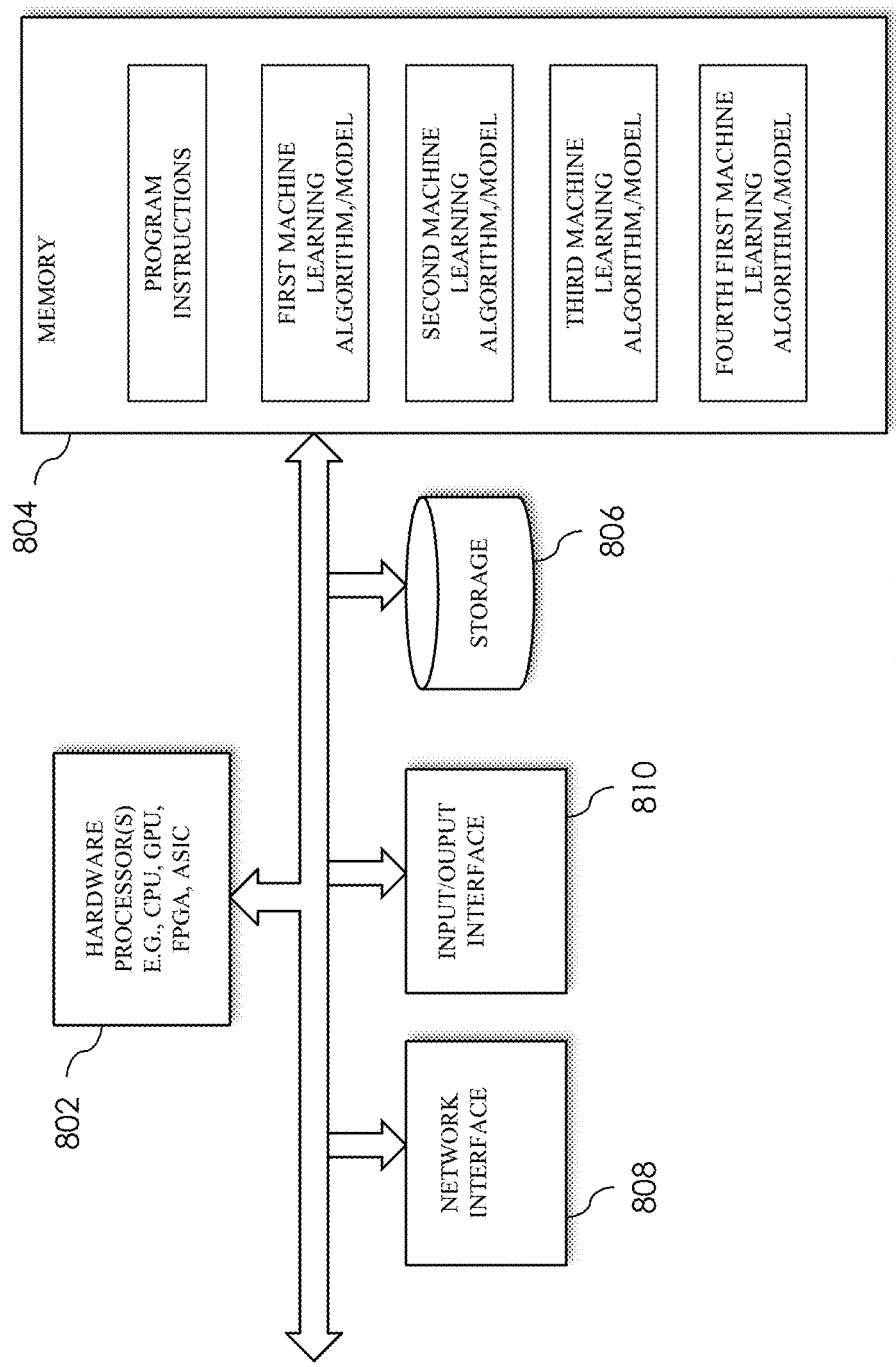
FIG. 8 is a diagram showing components of a system in one embodiment, which can enhance honey value chain.

FIG. 8 is a diagram showing components of a system in one embodiment, which can enhance honey value chain. One or more hardware processors 802 such as a central processing unit (CPU), a graphic process unit (GPU), and/or a Field Programmable Gate Array (FPGA), an application specific integrated circuit (ASIC), and/or another processor, may be coupled with a memory device 804, and may predict an optimal distribution of swarms (e.g., one or more groups of bees) for optimal honey value chain. A memory device 804 may include random access memory (RAM), read-only memory (ROM) or another memory device, and may store data and/or processor instructions for implementing various functionalities associated with the methods and/or systems described herein. One or more processors 802 may execute computer instructions stored in memory 804 or received from another computer device or medium. A memory device 804 may, for example, store instructions and/or data for functioning of one or more hardware processors 802, and may include an operating system and other program of instructions and/or data. One or more hardware processors 802 may receive input comprising image data of a geographic region or area, for example, taken by one or more unmanned aerial vehicles, one or more satellites. One or more hardware processors 802 may also receive data related to the environment of the geographic region, which can include existing and/or potential catchment areas (referred to generally as catchment areas). For instance, at least one hardware processor 802 may run a first machine learning model such as a neural network classifier with the images as input to identify resources in the geographic region, for example, in the catchment areas. At least one hardware processor 802 may also run a second machine learning model with the identified resources such as a trained mask-RNN to predict pollen and nectar concentration in the catchment areas. At least one hardware processor 802 may also run a third machine learning model with at least the predicted pollen and nectar concentration to predict honey yield in each of the catchment areas. An example of the third machine learning model can be an XG Boost regressor. At least one hardware processor 802 may also recommend placement of a swarm to at least one of the catchment areas. In an embodiment, trained machine learning models may be stored in a storage device 806 or received via a network interface 808 from a remote device, and may be temporarily loaded into a memory device 804 for execution by one or more hardware processors 802, to predict one or more locations of catchment areas for optimal honey value chain. One or more hardware processors 802 may be coupled with interface devices such as a network interface 808 for communicating with remote systems, for example, via a network, and an input/output interface 810 for communicating with input and/or output devices such as a keyboard, mouse, display, and/or others.

Figure 9:
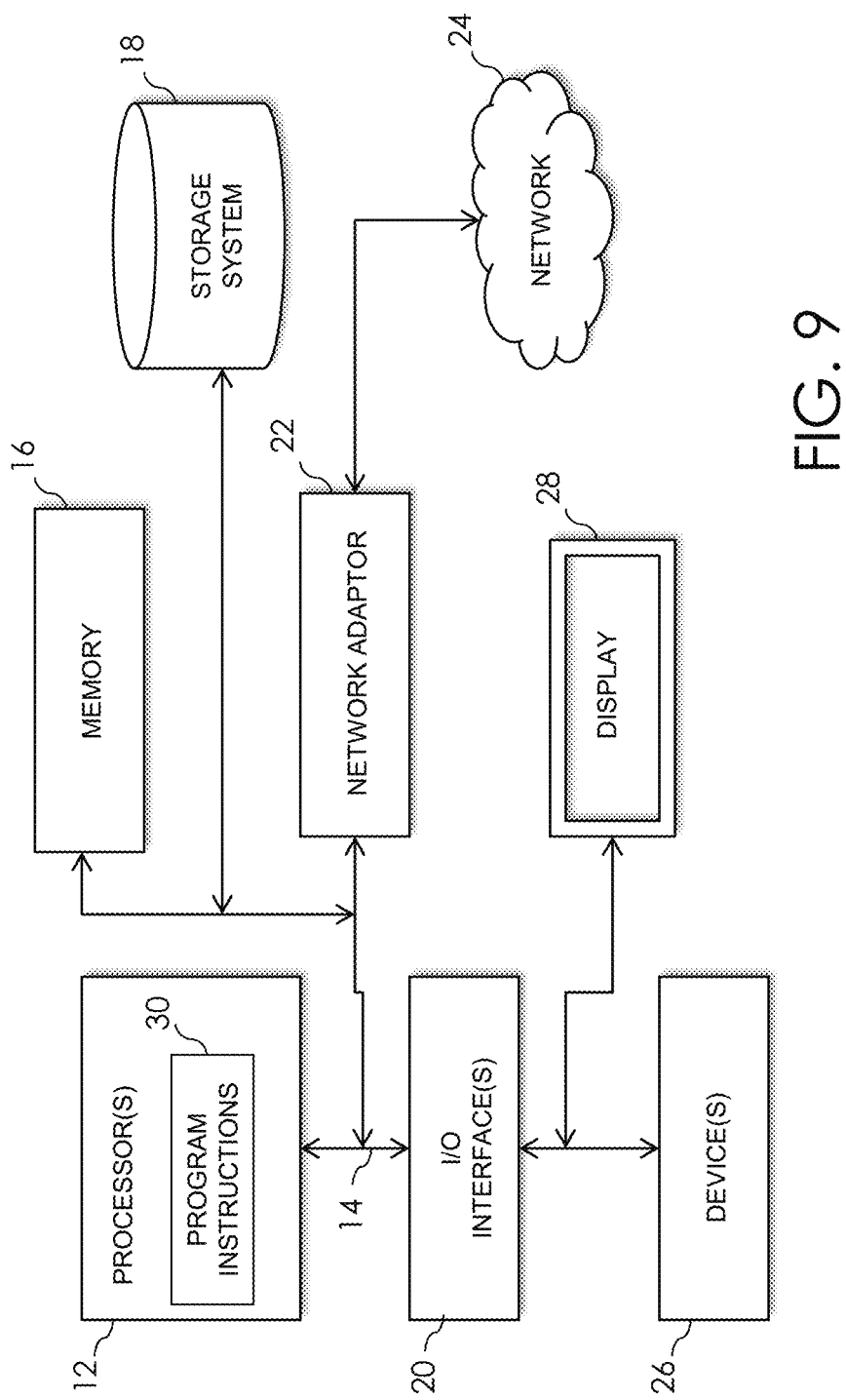
FIG. 9 illustrates a schematic of an example computer or processing system that may implement a system in one embodiment.

FIG. 9 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
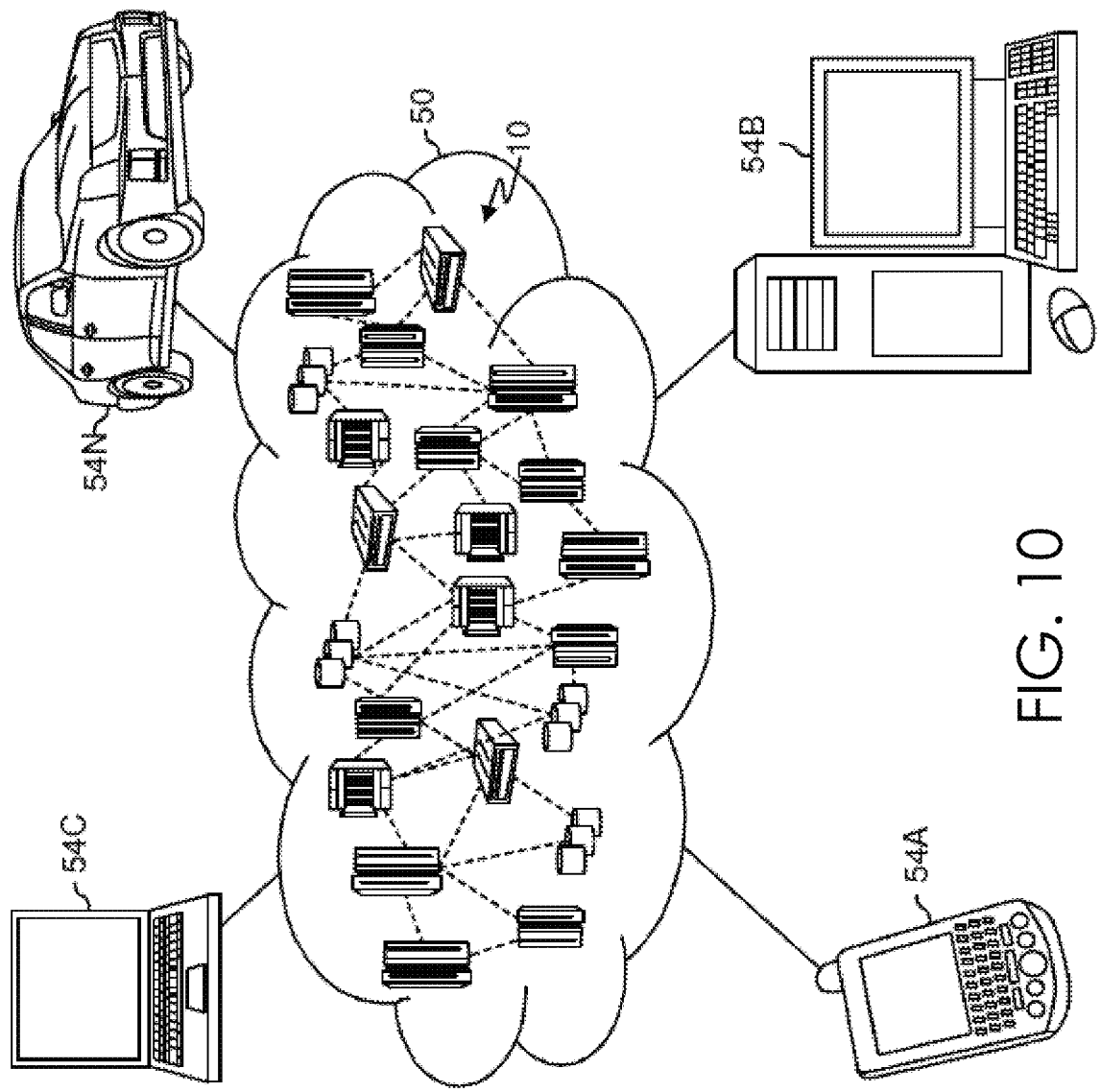
FIG. 10 illustrates a cloud computing environment in one embodiment.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
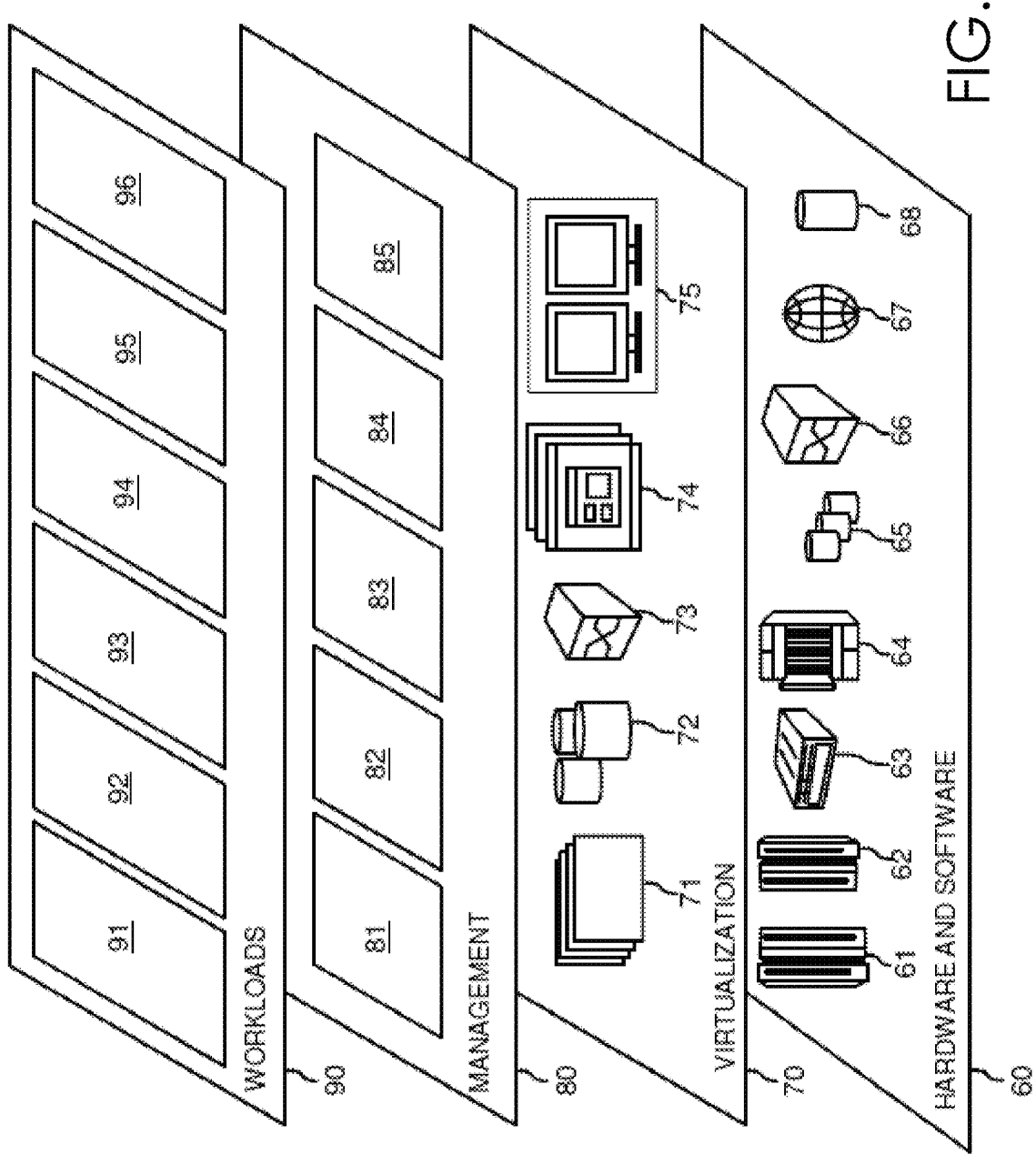
FIG. 11 illustrates a set of functional abstraction layers provided by cloud computing environment in an embodiment.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and honey value chain enhancement processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving images of a geographic region including catchment areas;
running a first machine learning model with the images as input to identify resources in the catchment areas;
running a second machine learning model with the identified resources to predict pollen and nectar concentration in the catchment areas;
running a third machine learning model with at least the predicted pollen and nectar concentration to predict honey yield in each of the catchment areas; and
determining placement of a swarm to at least one of the catchment areas.

2. The method of claim 1, wherein the receiving images of catchment areas includes controlling a set of unmanned aerial vehicles (UAV) to capture the images of catchment area.

3. The method of claim 1, further including controlling an unmanned aerial vehicle to guide the swarm to the at least one of the catchment areas.

4. The method of claim 1, wherein the first machine learning model includes a trained labeled classifier.

5. The method of claim 1, wherein the second machine learning model includes a trained mask-recurrent neural network (RNN), the trained mask-RNN trained to predict a time series of flowering periods associated with the catchment areas.

6. The method of claim 1, wherein the third machine learning model includes a trained extreme gradient Boost regressor.

7. The method of claim 1, further including estimating a risk score associated with each of the catchment areas.

8. The method of claim 7, wherein the estimating of the risk score associated with each of the catchment areas include determining a dimension of a catchment area, proximity to water source and depth of the water source, human activity in the catchment area, concentration and effect of pesticides in the catchment area, concentration of pests and severity of epidemics the pests cause in the catchment area, and air quality associated with the catchment area.

9. The method of claim 8, wherein the human activity includes at least one of construction work, road work, plantation of a forest, deforestation, and new farm implanted in a threshold distance of the catchment area.

10. The method of claim 7, further including estimating a mapping of an optimal distribution of a swarm based on the honey yield and the risk score.

11. The method of claim 7, further including predicting a future migration location of a swarm.

12. The method of claim 11, wherein the predicting the future migration location of the swarm includes:
controlling a set of drones to observe movements of a scout bee in the swarm as the scout bee looks for locations in the catchments for migration and to observe communication of the scout bee and the swarm.

13. The method of claim 12, further including countering a swarm migration plan to the future migration location responsive to determining that the future migration location has the risk score exceeding a threshold risk score.

14. The method of claim 13, further including controlling a set of drones to apply environmentally friendly synthetic compounds to repel the swarm from the future migration location.

15. The method of claim 13, further including controlling a set of drones to apply a signal generator that emits an acoustic wave signal.

16. The method of claim 1, further including controlling an unmanned aerial vehicle to incentivize at least one member of the swarm into following a given path toward the at least one of the catchment areas associated with the determined placement.

17. The method of claim 16, further including controlling the unmanned aerial vehicle to attract and trap a queen bee in the swarm to a chamber and carry the queen bee to the determined placement, and to release an attractant to the swarm in the given path toward the determined placement.

18. A computer program product comprising a computer readable storage medium having program instructions embodied therewith, the program instructions executable by a device to cause the device to:
   receive images of a geographic region including catchment areas;
   run a first machine learning model with the images as input to identify resources in the catchment areas;
   run a second machine learning model with the identified resources to predict pollen and nectar concentration in the catchment areas;
   run a third machine learning model with at least the predicted pollen and nectar concentration to predict honey yield in each of the catchment areas; and
   determine placement of a swarm to at least one of the catchment areas.

19. The computer program product of claim 18, wherein the device is further caused to control an unmanned aerial vehicle to guide the swarm to the at least one of the catchment areas.

20. A system comprising:
   a hardware processor;
   a memory device coupled with the hardware processor;
   the hardware processor configure to at least:
      receive images of a geographic region including catchment areas;
      run a first machine learning model with the images as input to identify resources in the catchment areas;
      run a second machine learning model with the identified resources to predict pollen and nectar concentration in the catchment areas;
      run a third machine learning model with at least the predicted pollen and nectar concentration to predict honey yield in each of the catchment areas;
      determine placement of a swarm to at least one of the catchment areas; and
      control an unmanned aerial vehicle to guide the swarm to the at least one of the catchment areas.

* * * * *